No. 669,913. Patented Mar. 12, 1901.
T. DALTON.
PRESS FOR THE MANUFACTURE OF AND UNDERCUTTING TILES, BRICKS, &c.
(Application filed Apr. 19, 1898.)
(No Model.) 12 Sheets—Sheet 1.

Fig 1

No. 669,913. Patented Mar. 12, 1901.
T. DALTON.
PRESS FOR THE MANUFACTURE OF AND UNDERCUTTING TILES, BRICKS, &c.
(Application filed Apr. 19, 1898.)
(No Model.) 12 Sheets—Sheet 2.

HALF SEC: THRO' MN ( HALF SEC: THRO' KL.

Fig 4.

No. 669,913. Patented Mar. 12, 1901.
T. DALTON.
PRESS FOR THE MANUFACTURE OF AND UNDERCUTTING TILES, BRICKS, &c.
(Application filed Apr. 19, 1898.)
(No Model.) 12 Sheets—Sheet 3.

No. 669,913. Patented Mar. 12, 1901.
T. DALTON.
PRESS FOR THE MANUFACTURE OF AND UNDERCUTTING TILES, BRICKS, &c.
(Application filed Apr. 19, 1898.)
(No Model.) 12 Sheets—Sheet 4.

Witnesses
C. D. Kesler
J. B. Keefer

Inventor
Thomas Dalton
By James L. Norris
Atty

No. 669,913. Patented Mar. 12, 1901.
T. DALTON.
PRESS FOR THE MANUFACTURE OF AND UNDERCUTTING TILES, BRICKS, &c.
(Application filed Apr. 19, 1898.)
(No Model.) 12 Sheets—Sheet 5.

Section thro' AB.

No. 669,913. Patented Mar. 12, 1901.
T. DALTON.
PRESS FOR THE MANUFACTURE OF AND UNDERCUTTING TILES, BRICKS, &c.
(Application filed Apr. 19, 1898.)
(No Model.) 12 Sheets—Sheet 6.

No. 669,913. Patented Mar. 12, 1901.
T. DALTON.
PRESS FOR THE MANUFACTURE OF AND UNDERCUTTING TILES, BRICKS, &c.
(Application filed Apr. 19, 1898.)
(No Model.) 12 Sheets—Sheet 7.

No. 669,913. Patented Mar. 12, 1901.
T. DALTON.
PRESS FOR THE MANUFACTURE OF AND UNDERCUTTING TILES, BRICKS, &c.
(Application filed Apr. 19, 1898.)
(No Model.) 12 Sheets—Sheet 8.

No. 669,913. Patented Mar. 12, 1901.
T. DALTON.
PRESS FOR THE MANUFACTURE OF AND UNDERCUTTING TILES, BRICKS, &c.
(Application filed Apr. 19, 1898.)
(No Model.) 12 Sheets—Sheet 9.

No. 669,913. Patented Mar. 12, 1901.
T. DALTON.
PRESS FOR THE MANUFACTURE OF AND UNDERCUTTING TILES, BRICKS, &c.
(Application filed Apr. 19, 1898.)
(No Model.) 12 Sheets—Sheet 10.

No. 669,913. Patented Mar. 12, 1901.
T. DALTON.
PRESS FOR THE MANUFACTURE OF AND UNDERCUTTING TILES, BRICKS, &c.
(Application filed Apr. 19, 1898.)

(No Model.) 12 Sheets—Sheet 11.

UNITED STATES PATENT OFFICE.

THOMAS DALTON, OF LEEDS, ENGLAND.

PRESS FOR THE MANUFACTURE OF AND UNDERCUTTING TILES, BRICKS, &c.

SPECIFICATION forming part of Letters Patent No. 669,913, dated March 12, 1901.

Application filed April 19, 1898. Serial No. 678,181. (No model.)

*To all whom it may concern:*

Be it known that I, THOMAS DALTON, a subject of the Queen of Great Britain, residing in the city of Leeds, England, have invented certain new and useful Improvements in Presses for the Manufacture of and Undercutting Tiles, Bricks, and other Articles, of which the following is a full, clear, and exact description.

The invention relates more particularly to presses for the manufacture of tiles for walls, ceilings, and floors; but it is also applicable to machines for the production of bricks and other articles which it is desired to bind together or affix to some other surface by means of cement, plaster, or other like substance. Its object is to produce during the operation of pressing an undercut in the back of a tile or in the fixing-surface of any other article into which the cement, plaster, or other substance used for fixing may enter and whereby the tile or other article may be keyed to its bed instead of being held by cohesion alone.

My invention was designed more especially for use in the top plunger or die of a tile or a brick press; but it is also applicable to the bottom plunger or die. There is, however, or at least there may be, a slight difference in the apparatus, according to whether it is to be used in the top or bottom, which difference will be hereinafter described. My operating mechanism, consisting, essentially, of a hollow plunger with a central rod or spindle mounted on a spiral spring, may be used in many different forms of head or die, and I therefore prefer in this specification to speak of the head or die as a distinct part of the plunger, whether top or bottom.

In the drawings forming part of this specification, Fig. 1$^A$ is a vertical section of one form of undercut in the back of a tile as made by that form of my apparatus shown in Figs. 2 to 4 or in Figs. 22, 25, 28, and 37. Fig. 1$^B$ is a plan view of the undercut back of the same tile. Fig. 1$^C$ is a vertical section of another form of undercut in the back of a tile made by that modification of my apparatus shown in Fig. 1 and Figs. 5 to 9. Fig. 1$^D$ is a plan of the undercut back of the same tile as referred to in Fig. 1$^C$. Fig. 16 is a vertical section showing a form of apparatus used with a compound crosshead. Figs. 16$^A$ and 16$^B$ are respectively a front and end elevation of the cross-head. Fig. 16$^C$ is a plan view of the same. Fig. 16$^D$ is a section of the center wedge, showing attachment to hollow spindle. Figs. 16$^E$ and 16$^F$ are respectively a side elevation and vertical section of the center wedge. Fig. 16$^G$ is a side elevation of one of the side wedges. Fig. 16$^H$ is an elevation of the same, the line of view being at a right angle to that in Fig. 16$^G$. Fig. 17 is a horizontal section on the line A B in Fig. 16, the center wedge being removed. Fig. 18 is a plan view showing the undercut. Fig. 25<sup>A</sup> is a plan view of the head.

Figure 1:
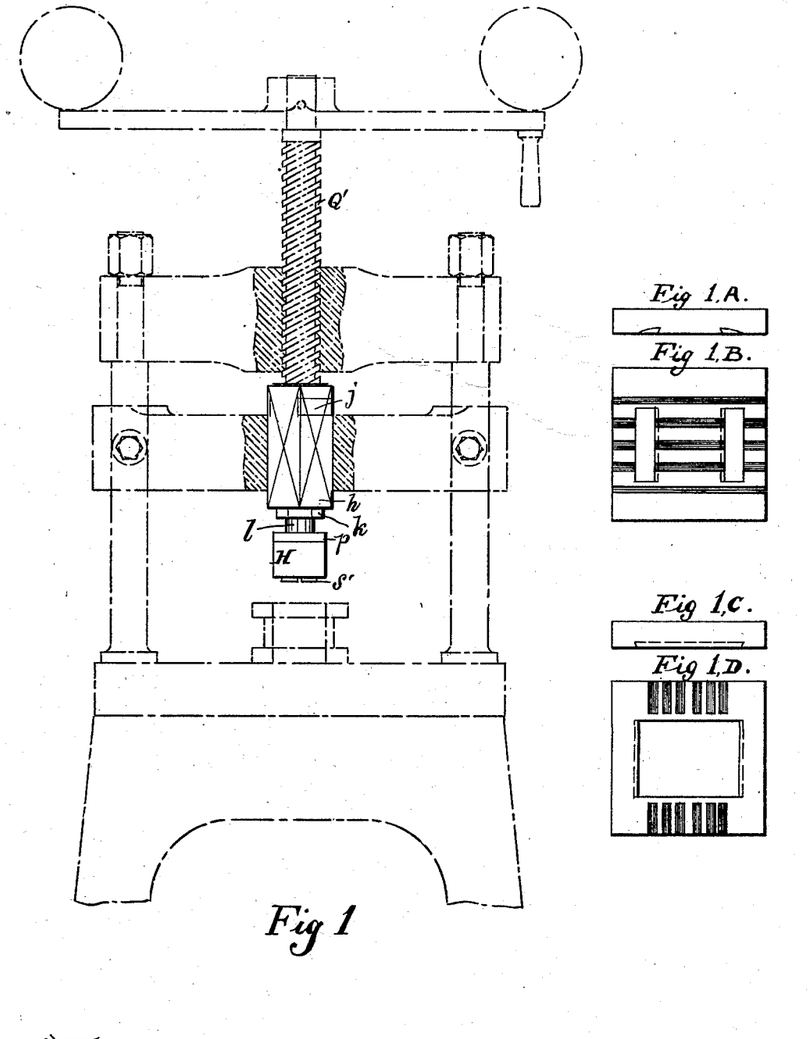
Figure 1 represents in front elevation that part of a press for making tiles which stands above the table, showing one form of my improved apparatus attached to the pressing-screw and drawn in full lines, the other parts being shown in chained dot.
Figure 2:
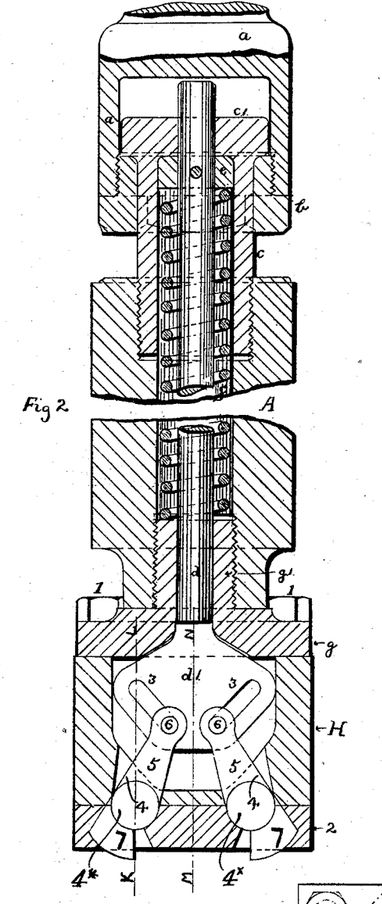
Fig. 2 is a vertical section showing what I term the "ring" form of apparatus.
Figure 3:
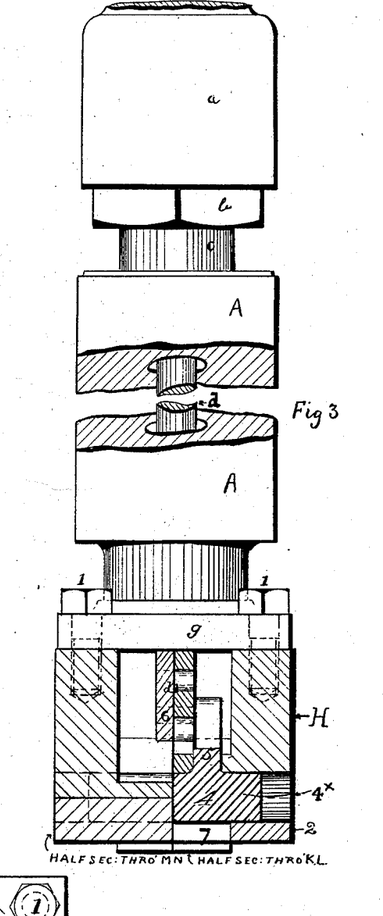
Fig. 3 is a similar sectional view of the same, the section-plane being at a right angle to that in Fig. 1 and showing the head or die in half-sections upon the lines K L and M N in Fig. 2.
Figure 4:
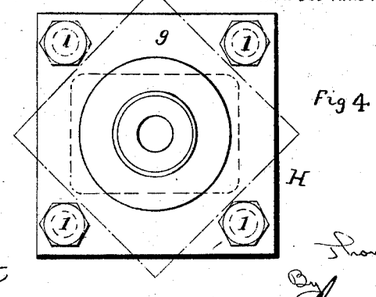
Fig. 4 is a plan view of the top of the head.
Figures 5, 6, 7, 8, 9:
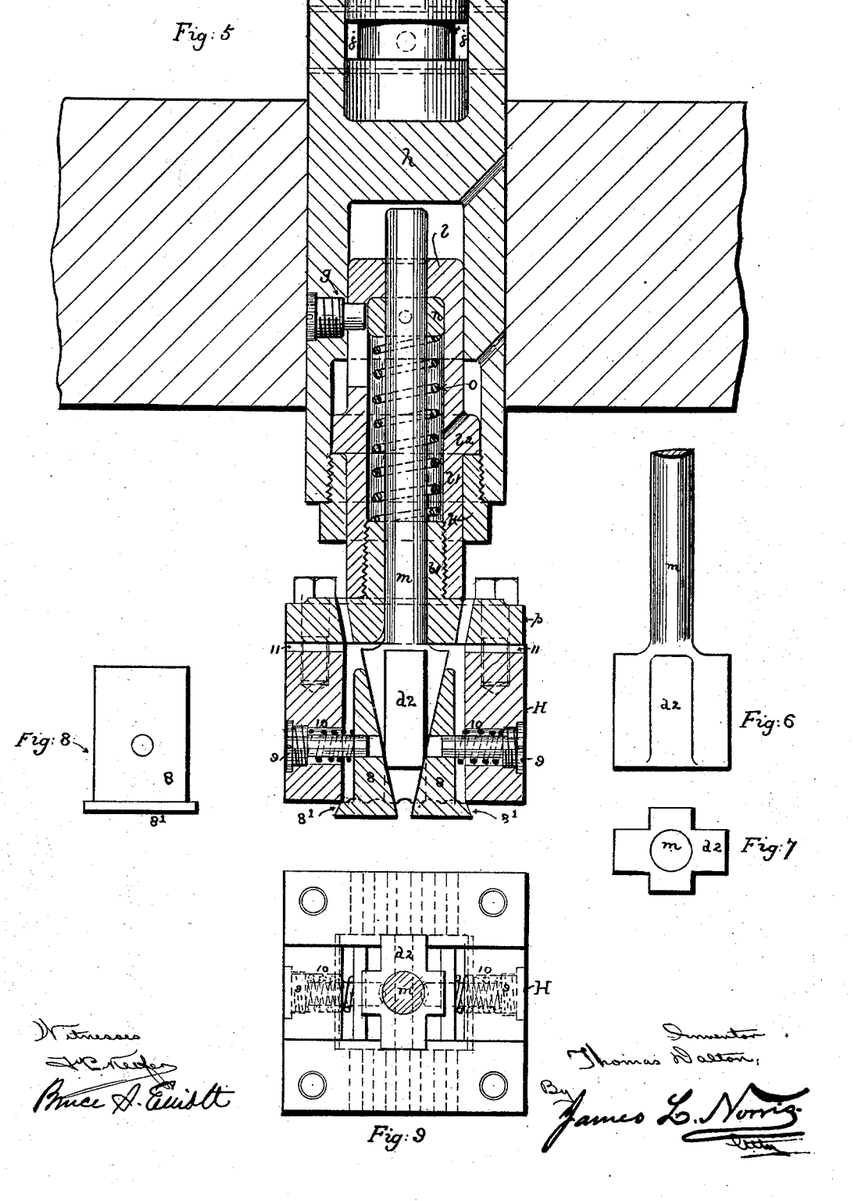
Fig. 5 is a vertical section showing what I term the "sleeve" form of apparatus.
Fig. 6 is a side elevation of the central rod.
Fig. 7 is a bottom plan view of the same.
Fig. 8 is a view of the rear face of one of the undercutting-wedges.
Fig. 9 is a bottom plan view of the head or die shown in Fig. 5.
Figure 10:
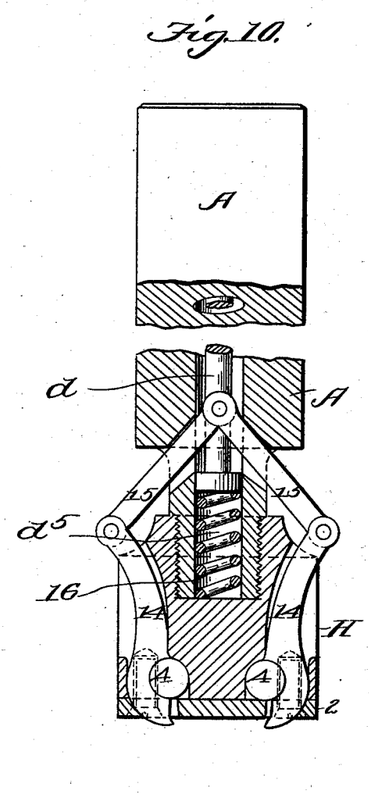
Figs. 10 and 11 are vertical sections showing other forms of heads or dies capable of use with the apparatus shown in Fig. 5.
Figure 11:
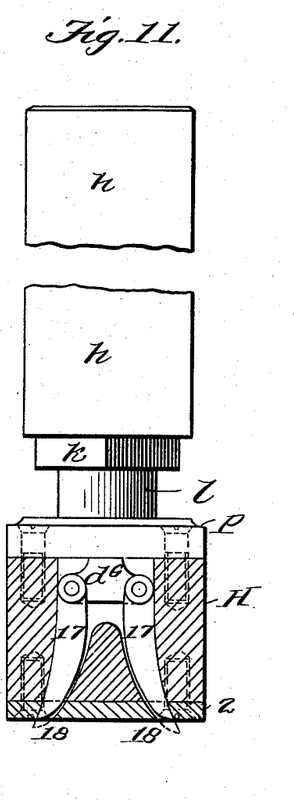

The reference-letter A in Figs. 2, 3, and 4 of said drawings indicates a top plunger made to slide vertically in the usual way suspended from a ring $a$, formed on or attached to the pressing-screw in any desired way by means of a neck $c$. The plunger is formed with a cavity in the center.

$b$ is a nut screwed into the open end of the ring $a$, so as to form a flange thereon.

The neck $c$ consists of a short hollow spindle formed with a collar or shoulder $c'$ at its upper end, so as to be retained within the ring by means of the nut $b$, and its lower end is screwed into the plunger A. The neck is elongated, so as to permit a certain amount of free vertical motion within the ring.

Through the top of the spindle $c$ or collar $c'$ and over the center of the cavity a hole is bored for the purpose hereinafter mentioned. In the center of the cavity is a rod or spindle $d$, the upper end of which passes through the aforesaid hole. This central rod or spindle is provided at its upper end with a fixed collar $e$ pinned thereon and is supported by a spiral spring $f$, both within the cavity. The length of the rod or spindle is such that when the press is at rest—that is to say, when the plunger is lifted—it stands slightly above the top of the plunger. The bottom $d'$ of the rod or spindle projects below the bottom of the plunger and into the attached head or die H for the purpose of operating undercutters fitted therein and is shaped according to the particular way the head may be fitted to give the undercut desired. The head or die may be fitted in various ways. According to the method here shown, Figs. 2 and 3, I use in suitable bearings at or near the pressing-face of the die two small cross-headed levers 4 4. On the face of each cross-head a tooth is formed, so that when the cross-head is partially revolved the tooth is forced inward toward (or it may be outward away from) the middle of the length of the tile-surface, and so forms an undercut.

$g$ is the top of the head H, forming the top die, formed with a neck $g'$, screwing into the plunger A, and attached to the other portion of the head H by bolts 1 1.

H is a frame bolted to the top $g$, and a covering-plate 2 forms the face of the die.

3 3 are slots formed in the flattened end $d'$ of the central rod $d$ and designed to produce an undercut inward—that is to say, toward the middle of the tile-surface.

4* represents trunnions or cross-heads formed on the levers 4 and upon which they are rocked.

5 5 are the long arms of the cross-headed levers, projecting upward, and 6 6 are studs mounted on the sides thereof and working into the slots 3 3.

7 7 are teeth or undercutting ridges formed across the face of the cross-heads and constituting the short arms of the levers. The teeth on the face of the cross-heads, as also of every other form of undercutter hereinafter described, may be either straight, curved, or hooked in vertical cross-section.

The action of my apparatus as applied to the top plunger is as follows: When it is desired to press a tile, the pressing-screw first allows the plunger (and therewith the die) to drop to the level of the material to be pressed and then forces down the center rod or spindle, and (when this is provided with slots, as above mentioned) the slots in the bottom acting on the studs on the levers 4 rock said levers and so cause the teeth thereon to turn inward (or outward, if so desired) away from a right angle. As the pressing-screw continues its motion it forces down the whole plunger and the pressure forces the tile dust or clay around the teeth on the cross-heads. When the pressure is released, the center rod or spindle rises by means of the spiral spring, and thereby rocks the levers backward, so that when the plunger is drawn up by the pressing-screw the teeth are clear of the undercut. The spiral spring ought not to have more strength than is needed to withdraw the teeth from the undercut without tearing, as there might be produced a hollow in the face of the tile if this pressure were excessive.

A modified form of my apparatus as applied to a top die is shown in Figs. 5 to 9. Instead of the ring, as in the first case, a partially-hollow spindle may be used (hereinafter referred to as a "sleeve") of the full length and to take the place of the slide of a plunger of ordinary construction. It may be of square, circular, or other approved section, having a cavity at the top into which is inserted a split collar for receiving and retaining the end of the pressing-screw, and instead of a slide with a neck at the top, as in the first case, an inner hollow spindle or sliding piece is used provided with a collar some distance away from the end for lifting purposes. The head is fitted with wedges instead of cross-headed levers for producing the undercut and a face-plate is not needed. $h$ is the sleeve (an alternative of a mere ring) attached to the pressing-screw Q' by a split collar at $j$, and $k$ is a retaining-nut screwed into the sleeve. $l$ is an inner slide formed with a cavity in the center, the alternative of the plunger when used without the sleeve, the part $l'$ of which represents the neck when my apparatus is used without the sleeve, and $l^2$ represents the collar or shoulder in the like case. $q$ is a steadying-pin screwed into the sleeve, with its point projecting into a vertical slot cut in the side of the sliding piece $l$ to prevent twisting. $m$ is the center rod or spindle with a collar $n$ pinned thereon, and $o$ is the spiral spring. $p$ is the top of the head H, forming the top die formed with a neck $p'$, screwing into the inner slide $l$. $d^2$ is the bottom end (in this case formed in the shape of a wedge) of the central rod descending into the head H for the purpose of operating the undercutters fitted therein. The top $p$ is attached to the other portion of the head H by bolts, as shown. H consists of a square frame, as before. 8 8 are wedges, each provided with a projecting ledge or tooth 8', at the bottom and extending over a part of the bottom surface of the die. The wedges 8 8 are mounted and slide freely on pins 9 9, screwed into the sides of the head H, and are kept in contact with the wedge $d^2$ by spiral springs 10 10, also mounted on the pins 9 9. The action of this form of head is as follows: The descent of the central rod forces the wedges 8 8 apart to form the undercut, and when it rises again the springs 10 10 force them back again, so as to clear the undercut. 11 11 are escape-holes.

Figures 16, 16A, 16B, 16C, 16D, 16E, 16F, 16G, 16H, 17, 18:
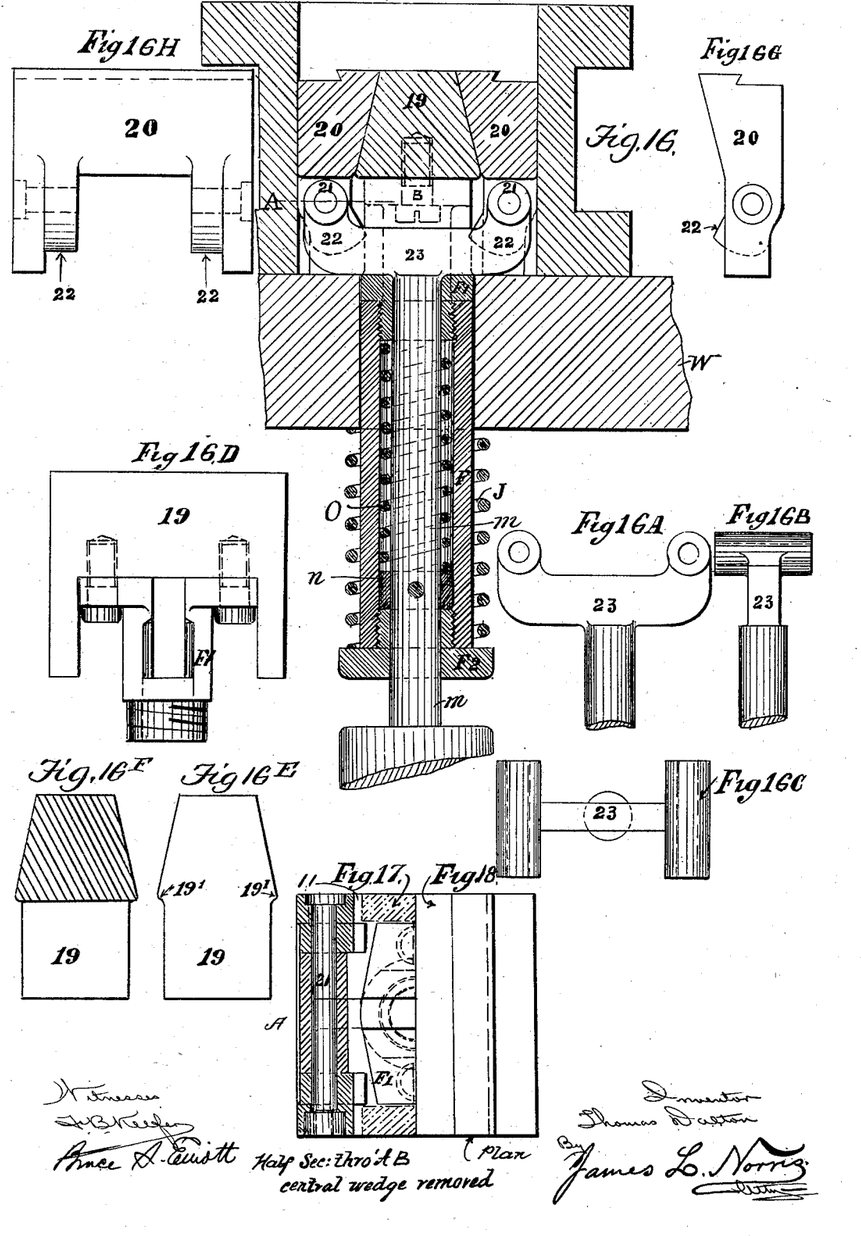

Instead of either cross-headed levers or rocking levers or sliding blades the head or die may be formed in halves with the line of separation vertical between them, (see Fig. 19,) each furnished with a tooth or undercutting ledge and operated by a similar mechanism to that before described; but I do not advocate this method, for among other reasons when this latter alternative method is used with a top plunger it is necessary that the tile-bed or bottom die should rise concurrently with the lifting of the top die to enable the sections of the top die to fall apart without tearing the undercut, and that a check-spring be also used to enable and insure the closing up of the two halves of the head before reaching the surface of the tile material. (See Figs. 40 and 41.) With such a head or die as last described the undercut must be inward; but the undercut may be turned outward by the use of the bottom of the central rod as a wedge between the other parts of the head, thus making the head or die in three sections, as seen in Fig. 16, and the parts may be so arranged that it shall not be necessary to lift the bottom die concurrently with the top one. I prefer to make the head or die with an outer frame inclosing the movable parts, as shown in Figs. 5 to 9 of the drawings.

My apparatus as used for the top die may be inverted and used for the bottom die; but inasmuch as the motion must in either case proceed from the pressing-screw the relative motions of the head or die and the central rod will be reversed, so that the die will descend onto the rod when pressure is applied and will lift off the rod when the pressure is released. I exhibit several forms of my apparatus as applied to the bottom die, as well as a method of assimilating to the bottom die the action of the apparatus as used with a top die.

When the sleeve form of apparatus is used, (see Figs. 12 and 13,) a rim or collar must be constructed upon the upper end as a means of suspending it from the table. The rim or collar may be enlarged to a plate the full size of the tile-box, if desired.

Figure 12:
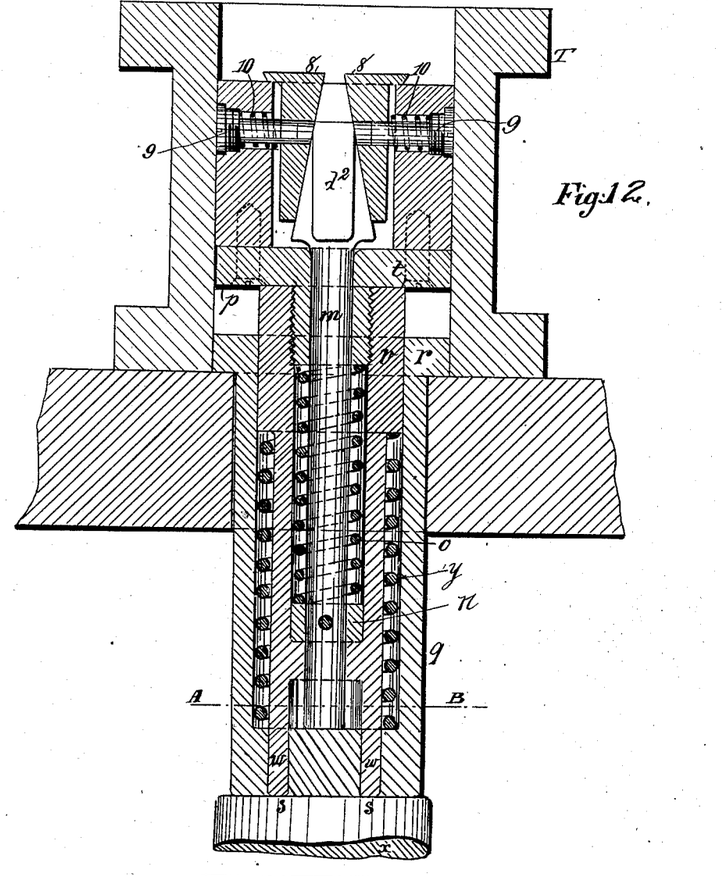
Fig. 12 is a vertical section of my apparatus applied as a bottom die, showing the inner sliding piece supported on a spring.
Figure 13:
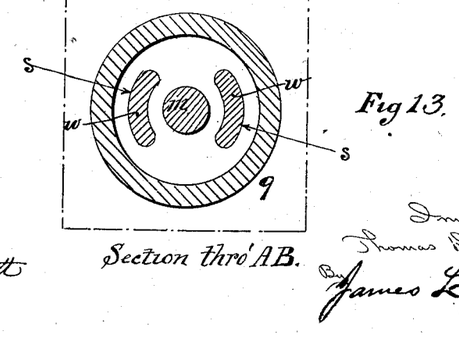
Fig. 13 is a horizontal section on the line A B in Fig. 12.

The thrust of the central rod is shown to be on the lower end of the sleeve. The spiral spring around the central rod will serve as a means of suspending the die on the rod. A second spiral spring may be introduced between the inner and outer slide to take the weight off the former and the attached head or die, thus leaving the central spring to operate the central rod only. The second spring will also provide for the necessary play of the central rod; but I prefer to lift the head or die by positive thrust from below by means of the ordinary lifting mechanism, and for this purpose I make the lower end of the inner slide with divided ends passing through slots or holes cut or formed in the lower end of the sleeve and projecting a sufficient distance to give the required amount of lift.

Referring to Fig. 12, $q$ is the sleeve, formed with a flange $r$ to suspend it from the table. $s\ s$ are the slots cut in the bottom of the sleeve. $t$ is the bottom plate of the head or die, formed with a neck screwing into the inner sliding piece $v$, consisting of a partially-hollow spindle containing the central rod $m$, collar $n$ thereon, and the spiral spring $o$, as in the case of the apparatus used with the top die. $w\ w$ are the divided ends of the inner hollow spindle or sliding piece $v$, made capable of passing through the slots $s\ s$ and project below them during the operation of pressing. $x$ is a bottom thrust-lifter as ordinarily used. $y$ is a spiral spring, the use of which is optional, supporting the sliding piece $v$. The rest of the figure is obvious. The action of this method is as follows: When the lifter $x$ rises, it strikes the divided ends $w\ w$, thereby lifting the inner slide $v$. When this has been partially lifted, the lifter strikes upon the bottom of the sleeve $q$ and then the whole apparatus lifts together.

Figures 14, 15:
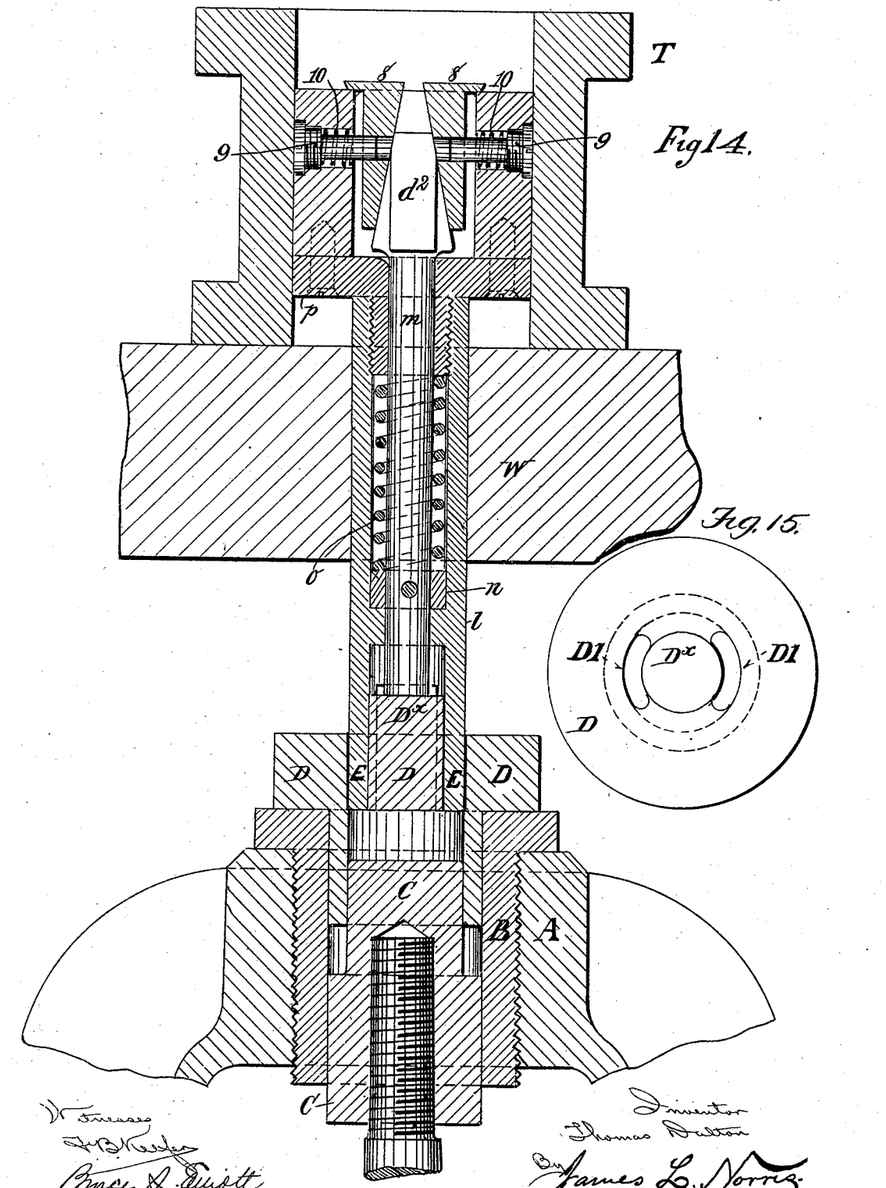
Fig. 14 is a vertical section of the apparatus constructed for a bottom die without sleeve.
Fig. 15 is a plan view of the disk, showing the segmental slots and spigot.

In Figs. 14 and 15 I have shown the form of apparatus "without sleeve" for the bottom die. To take the thrust of the central rod, I provide a cross-bar under the table, (intermediate between the table and the lifter,) made with a central boss A, into which is screwed a cylindrical bush B, with a flanged top for the purpose of providing an adjustable bearing for and so regulate the vertical travel of the central rod $m$. On the top of this there rests, in said Figs. 14 and 15, a stop-piece D, consisting of the disk D, with segmental slots D' D' and with a spigot $D^\times$ on the top. I make the end of the hollow spindle with suitable projections E E, passing through the aforesaid segmental slots, so as to come in contact with the lifter C. This is a method I have used in the press I have employed; but I do not confine myself to this particular method. The action of this form of apparatus is as follows: When the lifter C rises, it strikes the projections E E, thereby lifting the hollow spindle $l$, the central rod $m$ remaining stationary until when the hollow spindle has partially lifted its bottom strikes upon the collar $n$ on the bottom of the central rod $m$, and then the hollow spindle and the central rod lift together.

Figure 34:
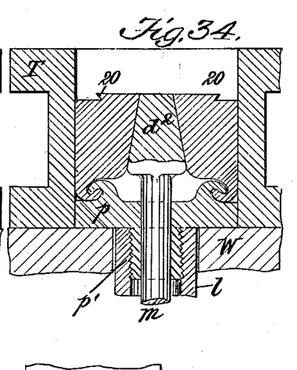
Figs. 34, 35, and 36 are other forms of head or die adapted to be mounted and operated as shown in Fig. 14.
Figure 35:
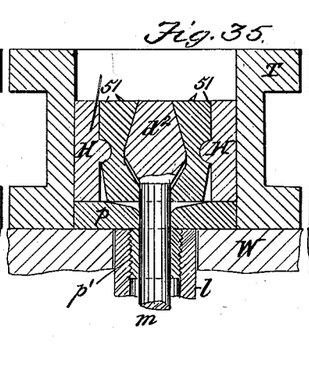
Figure 36:
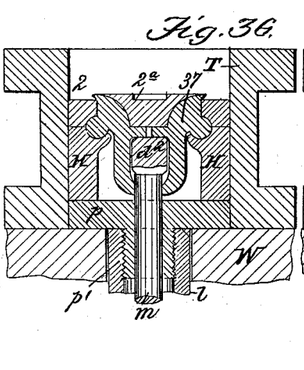

Figs. 34, 35, and 36 are other forms of head or die mounted on a hollow spindle and operated by a central rod and spiral spring, as shown in Figs. 14 and 15. Holding-down springs may be used, if desired.

Fig. 34 shows a head or die formed in three sections, an alternative form to that shown in Fig. 16. The side wedges are shown in engagement with the plate $p$ by means of hooks instead of steadying-pins, as in the other cases; but either method may be used. The central wedge $d$ is operated as in Fig. 12. The rest of the figure is obvious.

Fig. 35 shows two levers 51 rocking on ribs formed on the box sides; but they may be hinged thereto instead. The upper ends of the levers are provided with teeth shaped to the radius of oscillation for the purpose of forming undercuts in the back of the tile or other article and subsequently clearing out of the undercuts without tearing. The central wedge is operated as in Fig. 14. The rest of the figure is obvious.

Figures 25, 26, 27, 28, 29, 30, 31, 32, 33:
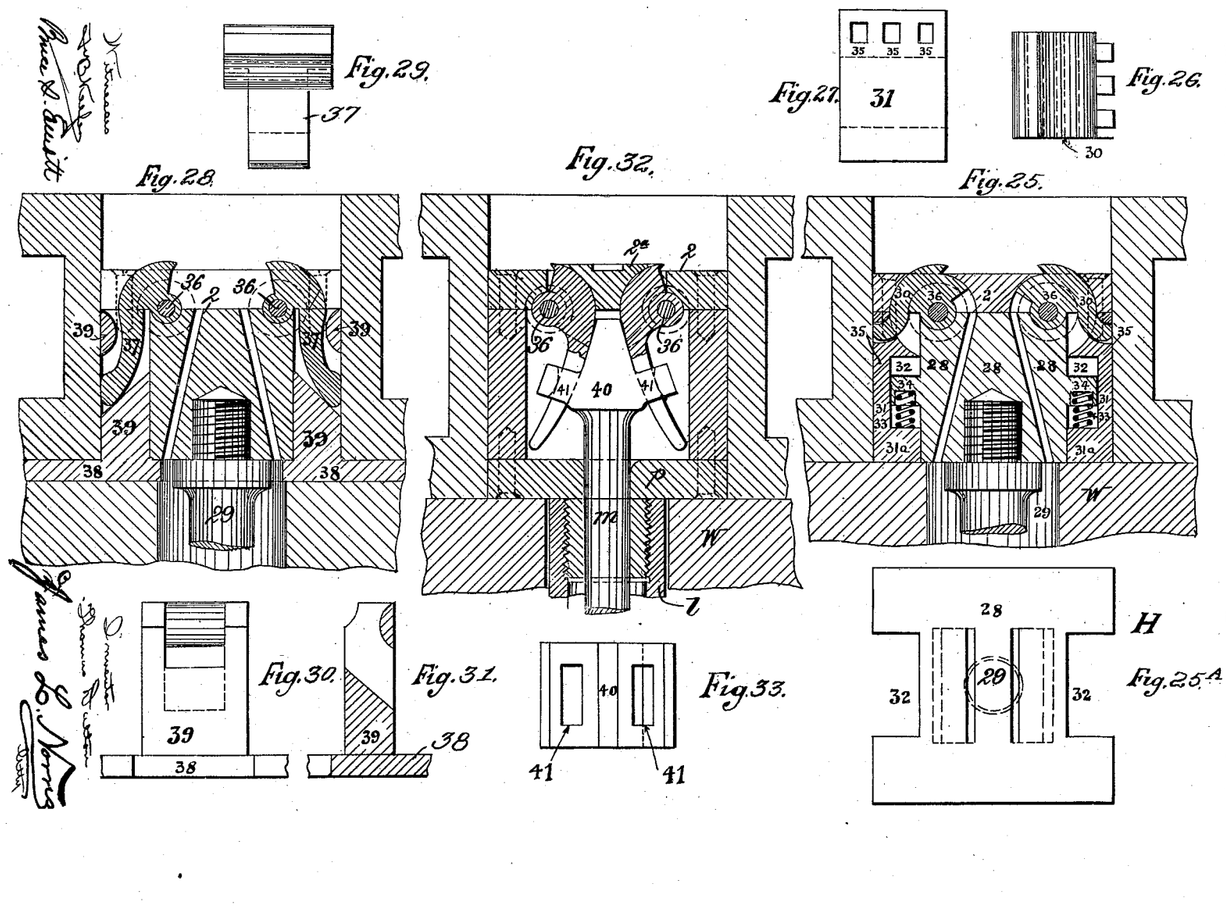
Fig. 25 is a vertical section showing a head-spindle and undercutters of modified construction.
Fig. 26 is a plan of one of the undercutters.
Fig. 27 is an elevation of one of the standards shown in Fig. 25.
Fig. 28 is a vertical section showing a modified form of head.
Fig. 29 is a rear elevation of one of the undercutters shown in Fig. 28.
Figs. 30 and 31 are respectively an elevation and vertical section of one of the push-pieces shown in Fig. 28.
Fig. 32 is a vertical section showing a head or die equivalent to that shown in Fig. 22.
Fig. 33 is a plan view of the top of the central rod as used in Fig. 32 looking down upon it.

Fig. 36 shows a form of head or die with the top plate made with a central part $2^a$, as shown in Fig. 32. The head is mounted on a hollow spindle and operated by a central rod, as in Fig. 14. 37 37 are undercutters somewhat similar in shape to those shown in Fig. 22 and are mounted in the head or die in the same manner; but they are designed to give an undercut outward. The rest of the figure is obvious.

The method of operating the central rod may be varied according to the direction of the undercut desired, also according to the form of undercutters to be used. For instance, when using a head or die formed in three sections the top of the central rod may be made cross-headed, (see Fig. 16,) with the arms of the cross-head made to pass through and slide vertically either within a bridge constructed in the middle section of the die or within slots cut through the upper end of the hollow spindle, so as to transmit the motion of the central rod to the parts outside of those attached to and supported by the hollow spindle. In this case the cross-bar bearing below the table and the forked ends of the hollow spindle may be dispensed with and the central rod may rest directly upon and be operated by the lifter. This may be the case also when using a head or die fitted with rocking undercutters operated by the methods described with reference to Fig. 22. The method of operating the central rod will also vary according to the method of lifting employed—that is to say, whether it be a fork working into a collar on the plunger or by means of a thrust from below. In some cases—as, for instance, in the case of a bottom die in three sections—it is desirable to use a holding-down spring, (see Fig. 16,) which may be spiral outside the plunger, using the under side of the table-top as a buttress.

Referring to Figs. 16 to 18, F is the hollow spindle, formed in two parts, the upper part F' of which screws into the lower and is formed as shown in detail in vertical section, Fig. $16^D$, and in plan in Fig. 17. $F^2$ is a flanged nut screwed into the bottom of the hollow spindle. $m$ is the central rod with collar $n$ attached, and O is the spiral spring operating the central rod, as in other cases. J is a holding-down spring (shown in spiral form outside the hollow spindle) resting on the flanged nut $F^2$ and engaging the under side of the table-top W. 19 is a central wedge (corresponding to the shaped rod end in previous figures) attached to the part F' by bolts, as shown. 20 20 are side wedges mounted and oscillating on pins 21, supported by the outer ends of the cross-head 23, with their lower ends resting on the table-top W to take the weight of the thrust. 22 22 are trip projections formed on the side wedges. 23 is the cross-head, integral with the central rod and shown in detail in Figs. $16^A$, $16^B$, and $16^C$. The action is as follows: When the lifter rises, it strikes the bottom of the central rod $m$, thereby lifting the side wedges, and then the trip projections striking against the projecting edges 19' 19' of the central wedge cause the side wedges to fall inward. When the lifter strikes the bottom of the hollow spindle, the whole apparatus lifts together.

Figures 19, 21:
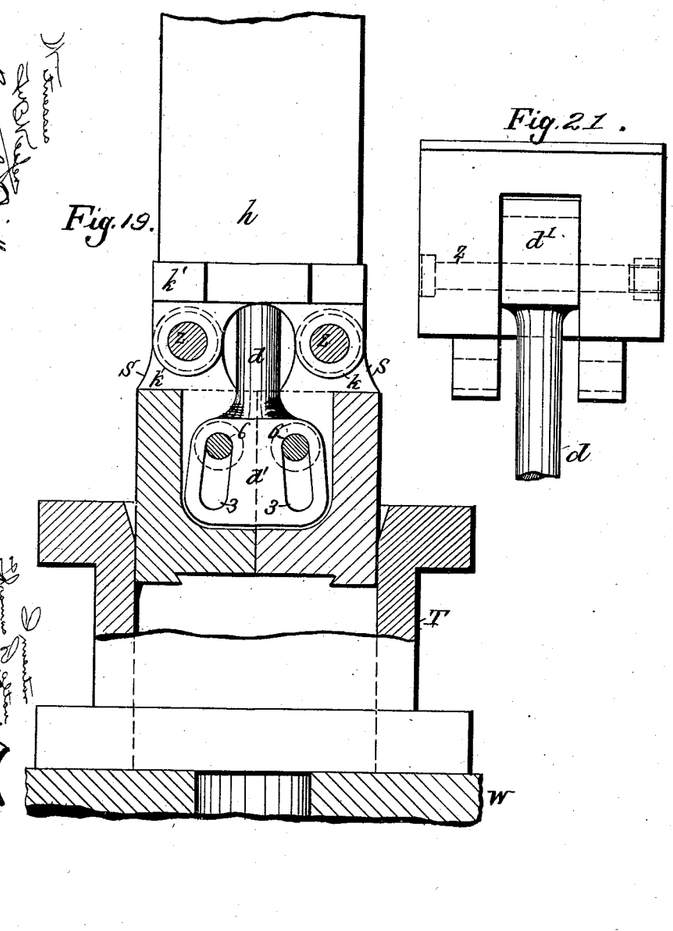
Fig. 19 is a vertical section of a split head made in halves and applied as a top die.
Fig. 21 is a side elevation of the head shown in Fig. 20.

Fig. 19 shows a form of split head, made in halves, as applied to a top die and operated by the end $d'$ of the central rod $d$ and inclined slots 3, as described with reference to Fig. 2. $k'$ is a nut screwing into the sleeve $h$, with brackets formed thereon, to which the two halves of the split head are suspended by means of pins $z$.

Figure 20:
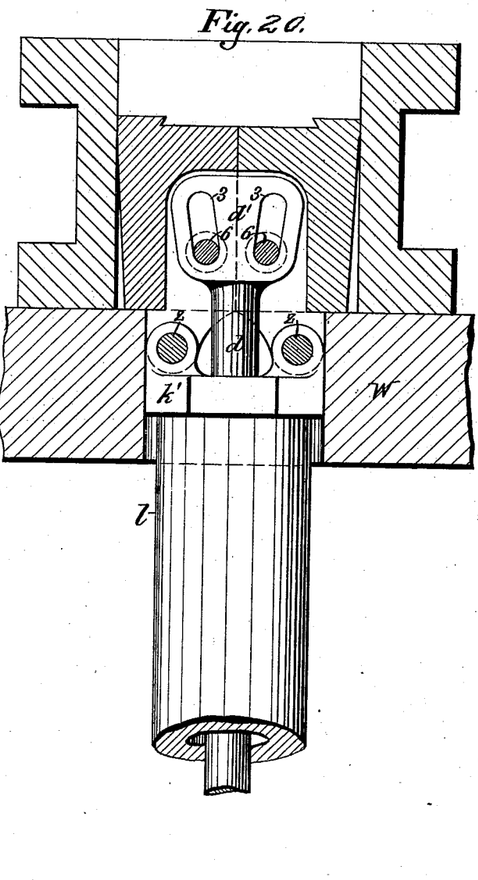
Fig. 20 is a vertical section showing a split head made in halves and applied to a lower die.

Fig. 20 is a form of split head, made in halves, as applied to a bottom die; but in this case the sides are shown tapered to form a clearance from the undercut.

Fig. 21 is a side elevation of the head, showing the cavity for receiving the flattened end of the central rod.

The lifting of the die is effected by means of a hollow spindle with divided ends, as shown in Fig. 14. The central rod lifts with the head until clearance is effected by the die lifting above the top of the tile-box. The rest of the figures is obvious.

Figure 22:
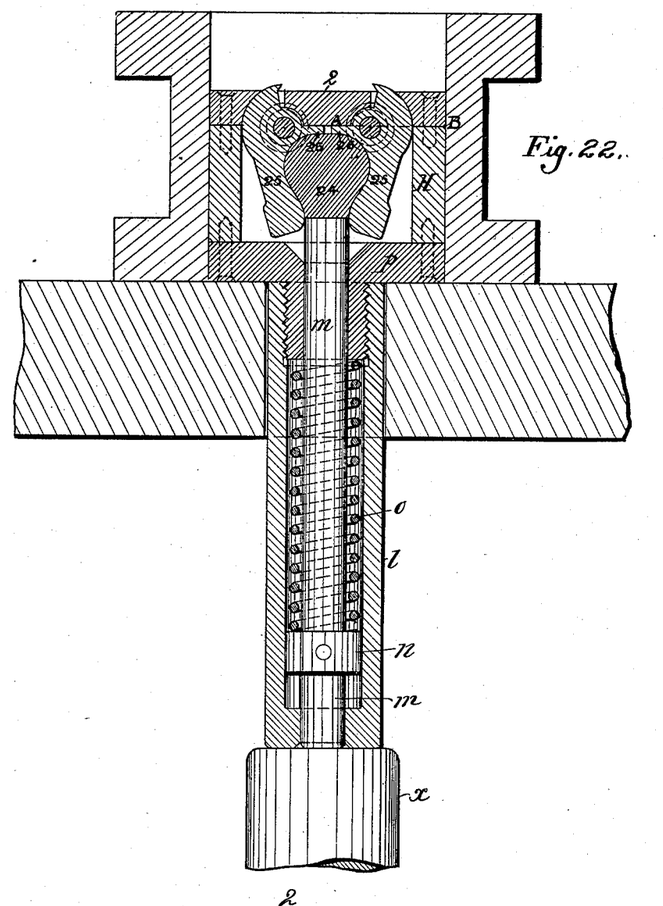
Fig. 22 is a vertical section showing a modified construction.
Figure 23:
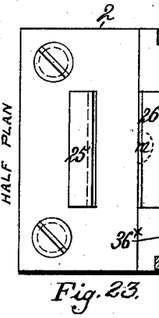
Fig. 23 is a half-plan view showing the form of undercut.
Figure 24:
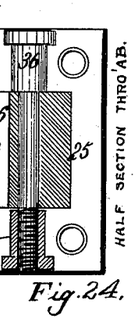
Fig. 24 is a half-section upon the line A B in Fig. 22.

Fig. 22 to 24 exhibit an alternative form of my apparatus, in which the undercutters are moved to and held in their forward position by the thrust of the spiral springs and are made to clear the undercut by the direct action of the lifter of the bottom of the central rod. Fig. 22 shows the central rod as lifted. 24 is the pear-shaped head of the central rod. 25 25 are undercutters whose lower limbs are adapted to this particular form of central rod end. 26 26 are projections formed solid with the rest of the undercutter. 36 36 are steadying-pins passing through the head from side to side. The descent of the central rod under the action of the spiral spring will throw the undercutting-teeth into their forward or cutting positions. The rest of the figures is obvious.

In Fig. 32 the head is mounted on a hollow spindle and operated by a central rod and spiral spring, as in Fig. 22. The top plate 2 is formed with a central portion 2ª, fitted into the surrounding part 2. 36 36 are steadying-pins with screwed ferrule ends, upon which the cutters are mounted. 40 is the shaped end of the central rod, made wedge-shaped, with projecting horns provided with openings 41 41 for receiving the tail ends of the undercutters. The rest of the figure is obvious.

Fig. 25 is a bottom die screwed onto a lifting-spindle of ordinary form and in which two operating-rods (here called "push-pieces") are used, placed at the sides.

Figs. 25ᴬ, 26, and 27 are details of Fig. 25. 2 is a top plate secured by flush-headed screw to the top of the block 28, screwed onto a spindle 29 of the ordinary type. 30 30 are the partially-revolving undercutters, levers in effect though not in shape, with the long ends projecting outward and tailed so as to work loosely into suitable holes 35 in the push-pieces 31 31, sliding loosely in the recesses 32 32, formed in the block 28, each fitted with a foot or flange 31ª to receive the thrust of the spiral springs 33 33 on the descent of the head onto the pressing-table. 34 34 are buttress-pieces constructed solid with or screwed to the block 28. 36 36 are steadying-pins with ferrule ends, as shown in Fig. 24. The peculiar form of undercutter or rocking lever in this case is designed to prevent the passage of material beneath the top plate when the cutting-tooth is pulled backward by the descent of the push-piece on the lifting of the head. The push-pieces may be of any desired form instead of that herein and in my drawings described, and pulling-springs may be used instead of pushing-springs. A holding-down spring may also be used, so as to force the undercutters into position before the descent of the top die.

Figure 37:
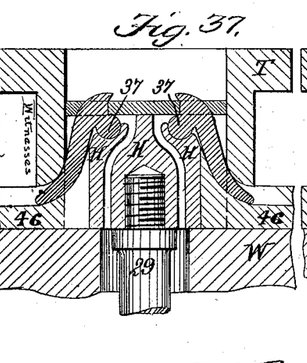
Fig. 37 is a vertical section showing a further modification in the head or die.
Figure 38:
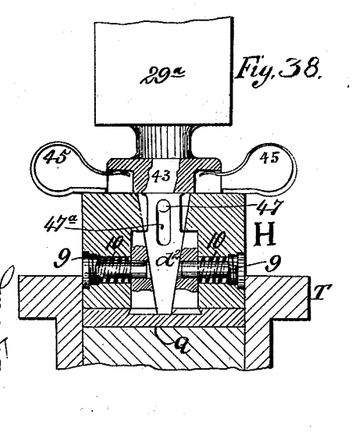
Figs. 38 and 39 are alternative forms of check-spring adapted to a head or die which is constructed and mounted as shown in Fig. 2.
Figure 39:
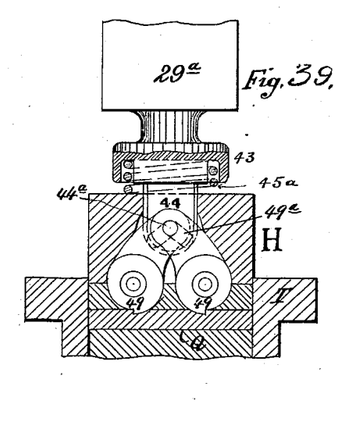

One of the methods I have devised for use in connection with a bottom die, whereby rods such as hereinbefore described are dispensed with, is illustrated in Fig. 37, wherein I use a head constructed as in the last case, (in fact, I have used the same head for both experiments;) but I use a rocking lever with long end projecting downward instead of outward, and I dispense with the buttress-pieces, the springs, and the push-pieces. Adjustable finger-wedges 46 and slots in the tile-box T are made to serve the purpose of a central rod and in which all springs are dispensed with. 37 37 are undercutters similar in shape and mounted in like manner as in Fig. 25. The flattened bar portions 46 46 of the finger-wedges pass through slots cut through the sides of the tile-box and are themselves provided with slotted bolt-holes, whereby they may be adjustably secured to the pressing-table outside the tile-box by bolts or screws, as shown. The rest of the figure is obvious. The finger-wedges also serve to regulate the extent of the undercut.

A further method which I designed in order to dispense with cutting the tile-box is illustrated in Fig. 28, which represents a form of head screwed onto a spindle of the ordinary type. Figs. 29, 30, and 31 are respectively details thereof. 29 is the lifting-spindle. 36 36 are steadying-pins, as in Fig. 24. 37 37 are undercutters mounted thereon, with their tail ends projecting downward instead of outward. 38 is a base-plate placed between the tile-box and the table-top. 39 39 are vertical standards cast solid therewith and formed with an inclined slot or pathway to receive and act as guides and operate the undercutters as the block lifts or lowers. The undercutters oscillate in bearings and are supported on pins with ferrule ends, as shown in Fig. 24. The rest of the figure is obvious.

Figure 40:
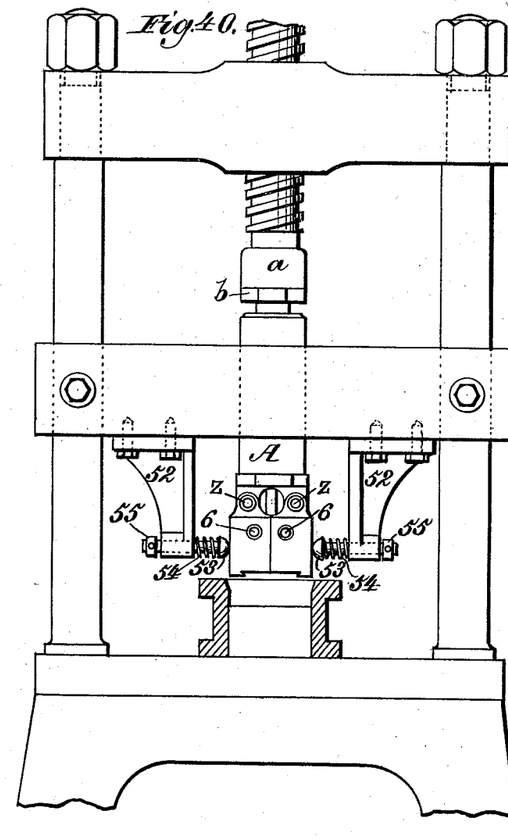
Figs. 40 and 41 are views showing alternative forms of check-spring.
Figure 41:
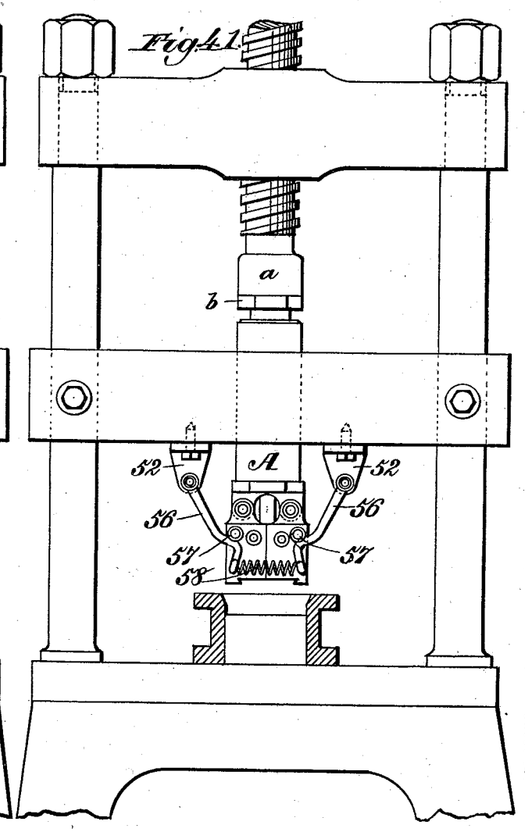

In Figs. 40 and 41 I show alternative forms of check-spring shown as applied to a head or die made in halves and attached to the plunger in the form shown in Fig. 2. The letters $a$, $b$, A, $k'$, and Z and the numeral 6 refer to the like parts as so marked in Fig. 2, except that the pins 6 6 are here shown as secured by circular nuts.

In Fig. 40, 52 52 are brackets bolted, as shown, to the guide-bar of the press. 53 53 are sliding bolts with suitably-shaped heads (shown hemispherical) and kept pressed against the head by spiral springs 54 54 and prevented from pushing out by pins and washers 55 55.

In Fig. 41 a like form of head and plunger are used with a different form of springs. 52 52 are brackets bolted to the guide-bar as before, but differing slightly in form. 56 56 are swinging arms suspended from the brackets and operating on pins 57 57, fixed on the head and fitted with washers for retaining the swinging bars in proper engagement with the pins 57. The swinging arms are connected one to the other and governed by a spiral spring 58 on two opposite sides of the head or die. I do not, however, confine myself to the particular form of check-spring shown in these figures.

I do not confine myself to the several forms of head or die hereinbefore described, for many forms may be used; but whatever form I may prefer to use I do not confine myself to any particular shape or number of undercuts, though I generally prefer two or four parallel with the edge of the tile. I provide for the escape of material pressed in past the undercutters; but the escape-holes are not shown in all cases. They appear at 11 in Fig. 5 and are shown as inclined passages in Figs. 25, 28, and 37.

What I claim is—

1. In apparatus for forming undercuts on tiles and the like, the combination of a hollow plunger having a shoulder or abutment thereon, a spindle within said hollow plunger having a shoulder or collar thereon, the said spindle projecting beyond said hollow plunger and adapted to be engaged by a reciprocating part, undercutting mechanism operated by said spindle, and a spring interposed between said spindle and said hollow plunger and engaging the shoulders on these parts, substantially as described.

2. In apparatus for pressing and forming undercuts upon tiles and the like, the combination with a plunger and a head or die secured thereto and having lateral projections thereon, of laterally-swinging, pivotally-mounted undercutters on said head provided with tails, slides for operating said undercutters provided with openings into which said tails extend, and with recesses into which said projections fit, and springs in said recesses engaging said slides at one end and said projections at the other, substantially as described.

3. In apparatus for forming undercuts on tiles and the like, the combination with a reciprocating part, having a cavity therein and a shoulder thereon, of a hollow sliding member fitting and moving within said cavity and provided with a shoulder adapted to engage the shoulder on the reciprocating part, a spindle within said sliding member one of its ends being adapted to be engaged by said reciprocating part, undercutting mechanism operated by said spindle and a spring interposed between and acting upon said spindle and said sliding member, substantially as described.

4. In apparatus for forming undercuts on tiles and like articles, the combination with a reciprocating part having a cavity therein and an internal shoulder, of a hollow sliding member, fitting and moving within said cavity and having an external shoulder to engage the internal shoulder in the reciprocating part, a rod or spindle fitted in a central opening in the sliding member, and extending through the same to be engaged by the reciprocating part, a collar on said spindle to engage an internal shoulder on said sliding member, undercutters operated by said spindle and a spring surrounding the latter and engaging the sliding member at one end and the shoulder on spindle at the other end, substantially as described.

5. In apparatus for forming undercuts on tiles and the like, the combination with a reciprocating part connected to a pressing-screw formed with a cavity having an internal shoulder, of an inner hollow slide, a collar on said slide to engage said internal shoulder, undercutters mounted in a head secured to the lower end of said inner hollow slide, a spindle to actuate said undercutters, fitting in the slide extending through an opening in the upper end thereof and adapted to be engaged by said reciprocating part, a collar on said spindle and a spring surrounding the latter one end engaging the inner collar on the sliding member and the other end engaging the collar on the spindle, substantially as described.

In testimony whereof I have hereunto set my hand in presence of two subscribing witnesses.

THOMAS DALTON.

Witnesses:
HERBERT L. P. LONDON,
HERBERT DUFFIELD.